United States Patent
Schmack (10) Patent No.: US 8,721,144 B2
(45) Date of Patent: May 13, 2014

(54) METHOD AND DEVICE FOR ILLUMINATING ROADSIDES

(75) Inventor: Andreas Schmack, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 13/262,745

(22) PCT Filed: Mar. 9, 2010

(86) PCT No.: PCT/EP2010/052937
§ 371 (c)(1),
(2), (4) Date: Dec. 22, 2011

(87) PCT Pub. No.: WO2010/112303
PCT Pub. Date: Oct. 7, 2010

(65) Prior Publication Data
US 2012/0092882 A1    Apr. 19, 2012

(30) Foreign Application Priority Data

Apr. 1, 2009    (DE) .......................... 10 2009 002 101

(51) Int. Cl.
*B60Q 1/00*    (2006.01)
*B60Q 1/02*    (2006.01)
*B60Q 1/08*    (2006.01)

(52) U.S. Cl.
CPC . *B60Q 1/02* (2013.01); *B60Q 1/085* (2013.01)
USPC ............ 362/539; 362/507; 362/464; 362/465

(58) Field of Classification Search
CPC .................................. B60Q 1/02; B60Q 1/085
USPC .............. 362/464, 465, 466, 507; 382/100, 3, 382/107
See application file for complete search history.

(56) References Cited

U.S. PATENT DOCUMENTS

| 5,567,032 A | 10/1996 | Heizmann |
| 5,908,239 A * | 6/1999 | Sugimoto ..................... 362/528 |
| 5,938,319 A | 8/1999 | Hege |
| 6,097,023 A * | 8/2000 | Schofield et al. .......... 250/208.1 |
| 6,254,259 B1 * | 7/2001 | Kobayashi ..................... 362/465 |
| 8,070,332 B2 * | 12/2011 | Higgins-Luthman et al. ............................. 362/465 |

(Continued)

FOREIGN PATENT DOCUMENTS

| DE | 197 13 884 | 4/1997 |
| DE | 196 42 467 | 4/1998 |

(Continued)

OTHER PUBLICATIONS

International Search Report for PCT/EP2010/052937, dated Apr. 27, 2010.

*Primary Examiner* — Ali Alavi
(74) *Attorney, Agent, or Firm* — Kenyon & Kenyon LLP (57) ABSTRACT

A method and a device for illuminating an edge region of a roadway by headlights of a vehicle are disclosed. The vehicle includes a camera. Activating takes place of at least one additional illuminating device or a masking of an headlight that is present on the vehicle. An additional illuminated region is generated which extends in the vertical and the lateral direction with respect to the vehicle. Activating the at least one additional illuminating device or headlight masking at least one headlight present in the vehicle takes place by a navigation system of the vehicle or in response to a decrease in the speed of the vehicle and/or by an object/traffic sign detection using the camera.

10 Claims, 4 Drawing Sheets

(56) References Cited

U.S. PATENT DOCUMENTS

| | | | |
|---|---|---|---|
| 8,433,479 B2* | 4/2013 | Lukacs et al. | 701/42 |
| 8,465,184 B2* | 6/2013 | Hue et al. | 362/466 |
| 2004/0143380 A1* | 7/2004 | Stam et al. | 701/36 |
| 2007/0247865 A1* | 10/2007 | Kinoshita et al. | 362/538 |
| 2009/0016073 A1* | 1/2009 | Higgins-Luthman et al. | 362/465 |
| 2011/0280026 A1* | 11/2011 | Higgins-Luthman | 362/466 |
| 2012/0257400 A1* | 10/2012 | Shibata | 362/460 |

FOREIGN PATENT DOCUMENTS

| | | |
|---|---|---|
| DE | 100 60 734 | 6/2002 |
| DE | 10300771 | 2/2004 |
| DE | 103 48 117 | 5/2004 |
| DE | 10 2007 001 558 | 7/2008 |
| EP | 0 465 330 | 1/1992 |
| EP | 2 028 4 11 | 2/2009 |
| FR | 27 97 614 | 2/2001 |
| WO | WO 01/01038 | 1/2001 |

* cited by examiner

METHOD AND DEVICE FOR ILLUMINATING
ROADSIDES

FIELD OF THE INVENTION

The present invention relates to a method and device for illuminating roadsides.

BACKGROUND

German Patent Application Publication No. DE 197 13 884 A1 relates to a method for controlling the headlight range and/or the illuminating direction of headlights in a vehicle. Sensors collect data on the vehicle and its surroundings. Based on these data, the current headlight setting of the headlights of the vehicle are adjusted prospectively to the requirements for illuminating the roadway lying ahead of the vehicle. The at least one sensor used is particularly a video sensor, which takes images of the course of the roadway which, in turn, are evaluated by an image evaluation unit. The illumination range of the headlights is controlled by determining the pitch angle of the vehicle with respect to the roadway. The pitch angle is ascertained via a plane determination of the roadway. By determining the yaw angle between vehicle and roadway, as well as the course of the roadway lying ahead of the vehicle, the horizontal illuminating direction and/or the illumination range of the headlights is regulated.

The headlights of other vehicles are detected by the image evaluation unit, and when the headlights are set to high beam, the headlights are automatically dimmed, or otherwise a warning is output to the driver of the vehicle. The detection of other vehicles is performed by evaluating the data of the at least one video sensor with the aid of an estimate of the image shift.

The data of the at least one sensor, particularly of the at least one video sensor, are checked in the image evaluation unit, the headlights being set to a stationary output position, if no meaningful parameters for setting the headlights are able to be derived from the data.

At night, in video systems that include, for instance, the above-mentioned video sensor, and which have wide-angle cameras, close objects which are located laterally next to the traveling vehicle can no longer be detected, and this applies especially to traffic signs, but also to persons. This happens because the illumination of the headlights is not sufficient. The dimmed light of a vehicle tends to radiate in a flat manner and little goes sideways. When the vehicle is traveling, the image explosion increases towards the edge. This particularly leads to a great increase in the motional unsharpness of objects located on the roadway edge, such as traffic signs or people present at the edge of the roadway. A remedy would be to reduce the exposure time. However, reduction in the exposure time goes along with a reduction in the contrast in the night vision system, which is also not beneficial to the detection performance of this system. Video systems, within the scope of night vision systems or the like, used in the present connection, include wide-angle cameras. In the present connection, one should understand by wide angle that the aperture angle of the video camera is greater than that of the headlights.

SUMMARY

Following the design approach in accordance with the present invention, it is proposed that one should mount additional headlights on a vehicle, or modify existing headlights in such a way, for instance, that by applying a mask, the roadside of the vehicle is illuminated better. By the design approach proposed by the present invention, it is achieved in particular that the roadside ahead of the motor vehicle is illuminated especially broadly, i.e. both very broadly outwards and also upwards. The proposed additional headlights on the vehicle, or a corresponding partial masking of the headlights already present on the vehicle, are able to be activated constantly when a video function of a night vision system is activated, or by a corresponding signal of a surroundings light sensor or by a day and night detection. Alternatively, it is also possible to activate the additional headlights when the dimmed light is activated. Finally, the activation of the additional headlights proposed according to the present invention, or a corresponding masking of headlights already installed in the vehicle, may be put solely at the judgment of the driver, and thus be put in complete control of the driver's decision, for instance, by triggering a key pressure. In one particularly advantageous execution variant of the design approach proposed in accordance with the present invention, the additional headlights may be linked to a navigation system located in the vehicle or to a mobile navigation system installed in the vehicle. This makes it possible, for example, to activate the additional headlight when a crossing or a fork in the road is approaching.

Besides the execution possibilities of the additional headlights as separate headlights and masking the headlights already installed in the vehicle, it may alternatively be provided that one should integrate the additional headlights into the standard headlights or link them to the fog light or the daytime running light, as has been the regulation in Scandinavia, for example, for a long time.

Integration of the proposed additional headlights into the standard headlight may be done, for instance, by operating the standard headlight as a partially infrared headlight having accordingly an infrared masking in the roadside.

The additional headlight in accordance with the present invention, which is able to be integrated in the motor vehicle according to one of the abovementioned execution possibilities, may be combined, for instance, with object recognition or traffic sign recognition by a camera, such as a video camera of an already available night vision system. Detected road signs or instruction signs, which are not able to be fully identified as to content by a possibly integrated traffic sign recognition system (RSR system, road sign recognition), are selectively illuminated, so that the driver is in a position to read them. This embodiment variant, linked with the travel speed of the vehicle, yields an additional, very interesting embodiment variant. Only if it is assured that the motor vehicle is traveling slowly enough, does illuminating the roadside of the roadway make sense, for otherwise the symbolics, that is, the image evaluation of the night vision system, are not legible, based on the image explosion in the edge region, which increases up to the edge of this system.

In a further, particularly advantageous embodiment possibility of the design approach proposed according to the present invention, the additional headlight or the IR headlight masking may be undertaken on one side, especially on the right side, in the case of left-hand drive vehicles. In variants of motor vehicles that are made in right-hand drive embodiments, the additional headlight or the standard headlight masking for IR light is accordingly on the left side. Finally, in a further advantageous embodiment variant, the additional headlight, or the IR masking, may be provided on both sides of the vehicle.

The design approach, proposed according to the present invention, improves the subjective feeling of safety of the driver decisively, especially when he is in unknown or little known surroundings on an unilluminated road, particularly a country road in the exit region of a locality. The design approach, proposed according to the present invention, also imparts security to the driver to the extent that, for instance, traffic signs having smaller script because of multiple locality identifications, are difficult to be processed by the driver at insufficient illumination with respect to the plentiful information offered. In this connection, the activation of an additional headlight for the improved illumination of the roadside, that is coupled to the slowing down of the speed of the vehicle, offers decisive aid, especially in the case of traffic participants that are very insecure at night.

In the following text, the present invention will be explained in greater detail on the basis of the drawings.

DETAILED DESCRIPTION

Figure 1:
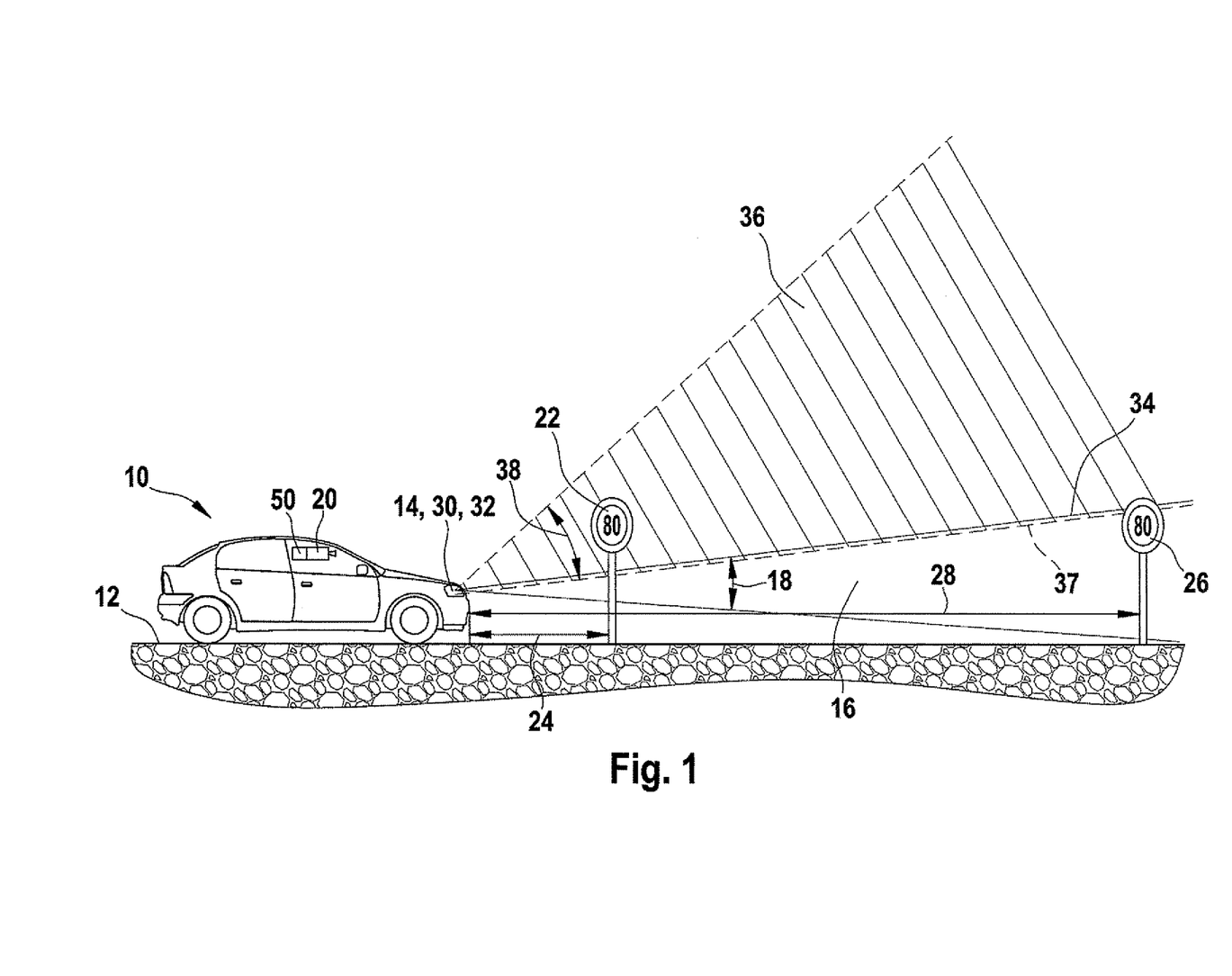
FIG. 1 shows a lateral representation of an additional illumination region generated by an additional headlight or an headlight masking.

In the representation according to FIG. 1, one may see a side view of an additional illuminated region, generated by the design approach proposed according to the present invention, in this case running in its perpendicular plane.

A vehicle 10 is traveling on a roadway 12, the region of roadway 12 respectively lying in front of vehicle 10 being illuminated by a couple of headlights 14, of which only one headlight is shown in the lateral representation according to FIG. 1. Headlights 14 of vehicle 10 shine a standard light cone 16 on the roadway region lying directly in front of the vehicle. This condition corresponds to driving in darkness or at bad visibility using dimmed light. The dimmed light is normally sufficient for a stretch of path of 25 to 50 m, depending on the positioning of the illumination width regulation, which illuminates the roadway as a function of the loading state of the vehicle. It may be seen in the representation according to FIG. 1 that the standard light cone designated by reference numeral 16 has a very low aperture angle 18. It may be seen from the representation according to FIG. 1 that the dimmed light and dimmed light cone 16 of vehicle 10 shines rather flat and very little upwards. Vehicle 10 may advantageously be equipped with a video camera for a night vision system. A control unit 50 is assigned to the camera, which is preferably a video camera 20.

The camera is a wide-angle camera, by which objects located laterally next to the vehicle, such as traffic signs or even people, are difficult to detect. The camera 20 used is preferably such that the aperture angle is greater than that of headlight 14.

It may be seen in the representation according to FIG. 1 that, with respect to the vertical illumination shown in FIG. 1, a first sign 22, which is located at a first distance 24 from the front of vehicle 10, is only partially recorded by standard light cone 16 that opens in a flat manner from aperture angle 18. The important information in this case, namely the speed limit, is not detected. By contrast, a second sign 26, which is located at a second distance 28 with respect to the front of vehicle 10, is recorded by standard light cone 16, and the information is able to be perceived by the driver. In the first-named case, that is, in response to only partial illumination of first sign 22, the first sign 22 has wandered out of standard light cone 16, and the driver is no longer in a position to perceive all the information. If what is involved, as shown in FIG. 1, is not a traffic sign bearing a speed limit, but a plate carrying distance information on the expressway or an information sign having several location names and several kilometer statements, taking up all the information while having insufficient illumination of this sign, which is usually located at the right edge of the roadway or is mounted above the roadway, can hardly be managed by the driver in unfamiliar terrain.

Following the design approach proposed according to the present invention, vehicle 10 is equipped with additional illuminating devices 30 at its front end and in the region of the right and/or left fender, next to headlights 14. Additional illuminating devices 30, which may be mounted either on the right side of the vehicle or on the left, for instance, in the vicinity of the outside rearview mirror or in the vicinity of the fenders, create an additional illuminated region 36, as shown in FIG. 1. Besides the separate additional illuminating devices 30, which may be integrated in the region of headlights 14, installed headlights 14 that are already located in the vehicle, may also be provided with an headlight masking 32.

Instead of the additional illuminating devices 30, which may be located, for instance, in the vicinity of the outside mirrors on the right or the left side of the vehicle, additional illuminating devices integrated into the front fenders are also conceivable.

As may be seen in the representation according to FIG. 1, an additional illuminated region 36 may be created using an additional illuminating device 30, that is integrated into headlights 14, which is characterized by a very large aperture angle 38. The additional illuminated region is shown by dashed lines in the illustration according to FIG. 1. It may be seen in the representation according to FIG. 1 that, when additional illuminating device 30 is activated, and when conventional standard light cone 16 about the additional illuminated region is broadened, the information of first sign 22, which is located at first distance 24 from the front end of vehicle 10, may be perceived perfectly well by the driver.

It may be seen in the representation according to FIG. 1 that a lower boundary of the additional illuminated region 36 extends directly to a first boundary 34 of standard light cone 16 that opens at flat aperture angle 18, with slight overlapping. This additional illuminated region 36, that is reproduced in the representation according to FIG. 1, is shown only in a side view in the representation according to FIG. 1, so that its vertical extension is made clear. Besides that, additional illuminated region 36 also has a lateral region, which is shown in greater detail in FIG. 2 and which extends perpendicularly into the plane of the drawing in FIG. 1.

Based on the overlapping of the vertical extensions, both of standard light cone 16 and additional illuminated region 36, both the upper side of roadway 12 is able to be illuminated and so are instruction signs 22, 26 located on the right road shoulder or above the vehicle. The degree of illumination of respective instruction signs 22, 26, that lie in additional illuminated region 36, may take place by the additional illuminating devices 30 or headlight masking 32 in a dimmed manner, in this context, i.e. at different intensities. In addition, additional illuminating device 30 may advantageously be coupled, for instance, to a control unit 50 for camera 20, shown in FIG. 1, which is preferably a video camera.

The at least one additional illuminating device 30 and the at least one headlight masking 32, at the front end of vehicle 10 or in the vicinity of the front fender, may be controlled in such a way that they are constantly switched on as soon as video camera 20 is activated within the scope of a night vision system. On the other hand, there is the possibility of controlling additional illuminating device 30 or 32 by a sensor-controlled day/night detection, or switching it on directly when needed; this being able to be left to the judgment of the driver.

Furthermore, the additional headlight may be coupled to the activation of the low beam.

Figure 2:
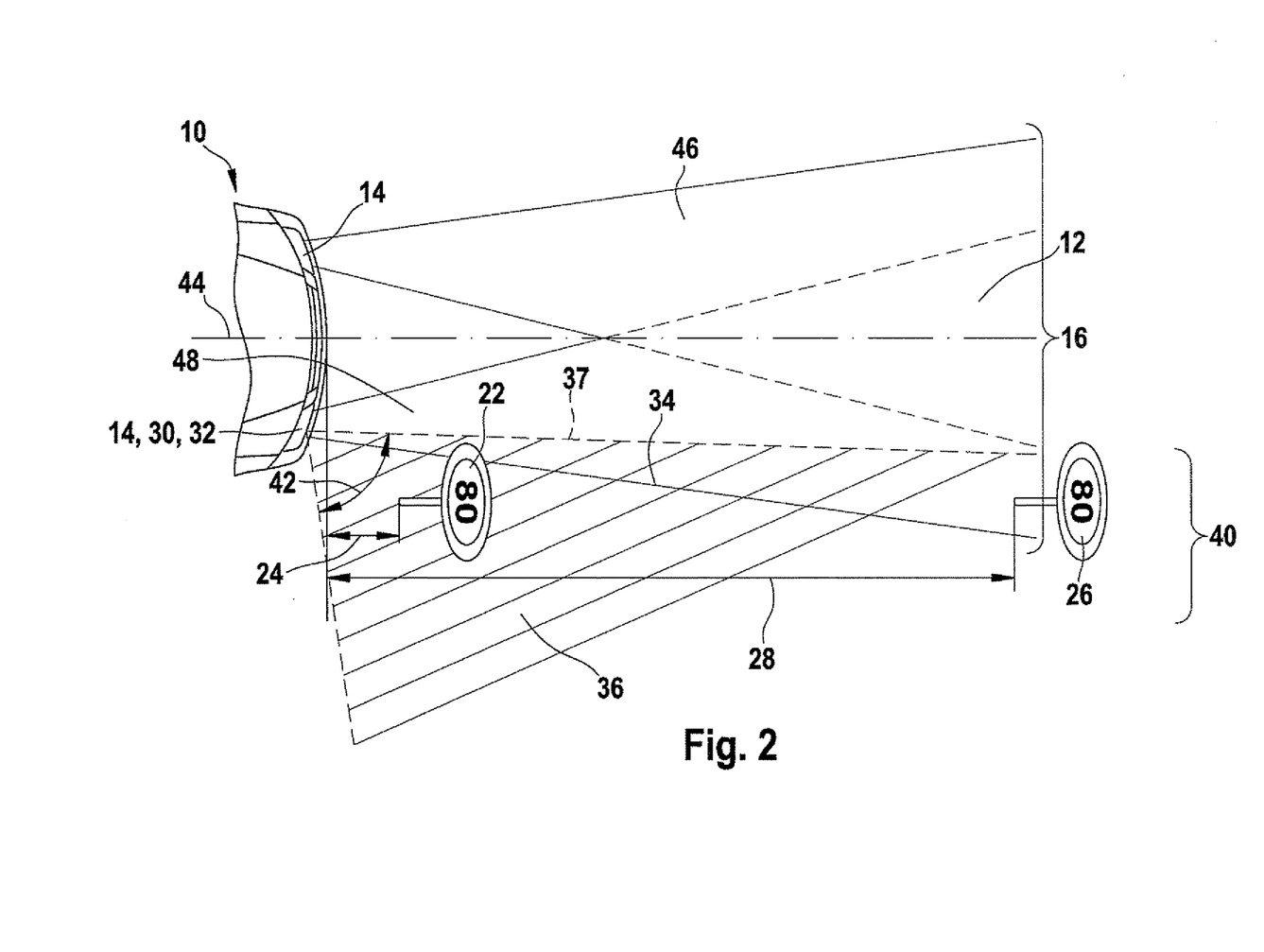
FIG. 2 shows a top view onto the right roadway edge of a roadway that is better illuminated by the design approach proposed according to the present invention.

The illustration according to FIG. 2 shows a top view onto the lateral illuminated region created by the design approach proposed according to the present invention.

As shown in FIG. 2, individual cones 46, 48 of the two headlights 14, located at the front end of vehicle 10, cover standard light cone 16 as soon as the lower beam is switched on. The two individual cones 46 and 48 overlap each other approximately in the region of vehicle longitudinal axis 44 of vehicle 10.

If additional illuminating device 30 is mounted on the right side of the vehicle, for instance, as shown in FIG. 2, vehicle 10 being driven on the left, a road shoulder 40 at the right edge of roadway 12 is able to be illuminated by additional illuminating devices 30. What is not shown in FIG. 2 is that the vertical extension of additional illuminated region 36 runs perpendicular to the plane of the drawing of additional illuminated region 36 shown in FIG. 2. As shown in FIG. 2, first instruction sign 22, which is at a first distance 24 from the front end of vehicle 10, lies fully within the lateral extension of additional illuminated region 36 on road shoulder 40. The illustration according to FIG. 2 shows that a part of second individual cone 48 of the main headlight overlaps with additional illuminated region 36 with respect to its lateral extension. Boundary 37 of additional illuminated region 36 covers boundary 34 of standard light cone 16, which appears via switching on the lower beams of vehicle 10.

As may be inferred from the representation of FIG. 2, first sign 22, which is located at the right edge of roadway 12 on road shoulder 40, is irradiated, that is, it is located in additional illuminated region 36, on the one hand, in its lateral extension according to FIG. 2, and on the other hand, in its vertical extension, as shown in FIG. 1.

In addition, one may see from the top view, according to the illustration of FIG. 2, that a lateral aperture angle 42 is of the order of magnitude of 90°. The lateral extension of additional illuminated region 36 broadens standard light cone 16, which is given by switching on the lower beams of vehicle 10, in the direction towards road shoulder 40, along roadway 12.

A particularly advantageous embodiment of the activation of the at least one additional illuminating device 30, or headlights masking 32 on the front headlights of vehicle 10, is linking the activation and/or masking to a navigation system that is situated in the vehicle. As soon as the navigation system of vehicle 10 detects that vehicle 10 is approaching a branching-off, either the at least one additional illuminating device 30 or headlight masking 32 are able to be activated via the navigation system. This means that both an illumination of the region vertically above vehicle 10 and of road shoulder 40 of roadway 12, that lies laterally next to vehicle 10, takes place, using the at least one additional illuminating device 30 or one of headlights 14, using the at least one masking 32. Furthermore, a linking may take place of the activation of additional illuminating device 30 or headlight masking 32 to the current travel speed of vehicle 10. Assuming it is dark, or poor weather conditions prevail, as soon as the driver reduces the speed of vehicle 10, and vehicle 10 has reached a speed that is below a certain specifiable or even individually specifiable threshold, upon the reaching of this speed of vehicle 10, the at least one additional illuminating device 30 and headlight masking 32 on one of headlights 14 may be activated. This provides the advantage that the at least one additional illuminating device 30 and headlight masking 32 makes possible the illumination at close range, be it vertically above the vehicle or laterally next to vehicle 10, so that, even in darkness or in response to bad weather conditions, the driver is still able to recognize the writing of instruction signs.

Finally, in one additional advantageous embodiment variant of the idea on which the present invention is based, a combination of the activation of the at least one additional illuminating device 30 or an headlight masking 32 of one of headlights 14 on vehicle 10 is able to take place by camera 20 or its control unit 50. Signs or instruction signs like signs 22 and 26 shown in FIGS. 1 and 2, which cannot be recognized by a possibly integrated RSR system, are selectively illuminated by the at least one additional illuminating device 30 or the at least one headlight masking 32 provided in the vicinity of headlights 14 of vehicle 10, so that the driver of vehicle 10 is put in a position of perceiving the information content of the instruction signs even in bad weather conditions or during darkness.

Moreover, following the design approach proposed according to the present invention, according to the representations in FIGS. 1 and 2, there is the possibility of coupling the at least one additional illuminating device 30 or headlight masking 32 with one of front headlights 14, or even with a fog light or even a daytime running light function. Additional illuminating device 30 or headlight masking 32 may also be coupled with the activation of the function of camera 20 or control unit 40 [sic; 50] of a night vision system. The activation of the at least one additional illuminating device 30 or headlight masking 32 at least one of headlights 14 may also take place by a corresponding signal of a light sensor or by a day/night detection. In addition, there is the possibility of activating the at least one additional illuminating device 30 or headlight masking 32 by video control unit 50 of a night vision system of vehicle 10. Additional illuminating device 30 or headlight masking 32 may be designed in such a way that the luminosity is selectively controllable, the luminosity is particularly able to be dimmed, so as to make possible the best varied detection performance individually from driver to driver.

As was mentioned above, the possibility of an embodiment of additional illuminating device 30 may take place as a separate, distinct headlight in the fender region or above the outer mirrors of vehicle 10; furthermore, there is the possibility of the integration of same into headlights 14 of vehicle 10 or into the fog light, or coupling it to the daytime running light. With regard to the spectral range of the additional illuminating devices, the additional illuminating devices may be designed both as infrared headlights or as VIS headlights.

Figure 3:
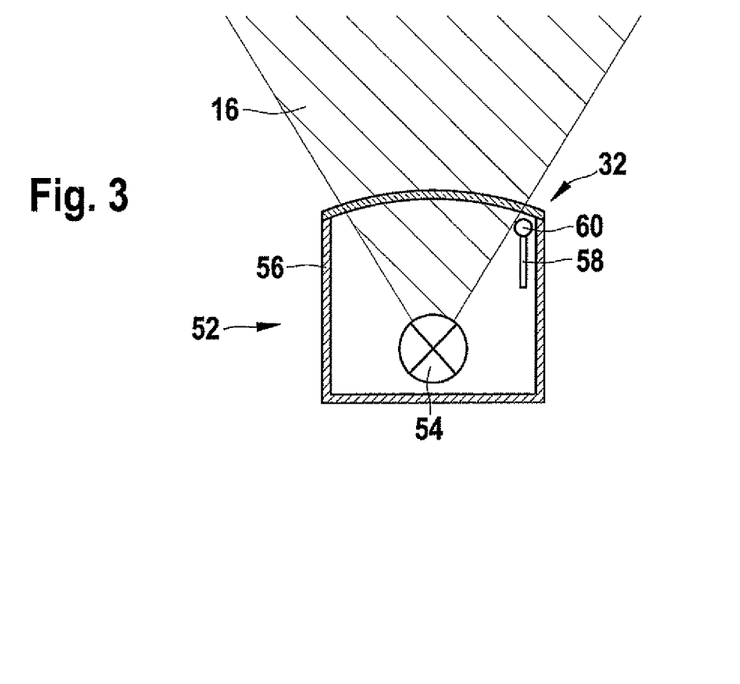
FIG. 3 shows another embodiment of a headlight mask, having a flap.

In the representation according to FIG. 3, one may see an embodiment variant of an headlight masking using a flap.

The illustration of FIG. 3 shows a headlight module 52, in whose housing 56 an illuminating device 54 is accommodated. Illuminating device 54 irradiates housing 56 and, at an active low beam, throws a standard light cone designated by reference numeral 16 on the roadway lying in front of the vehicle. It may be seen in the illustration of FIG. 3 that, laterally in housing 56 of headlight module 52, a headlight masking 32 is accommodated. In the exemplary embodiment according to FIG. 3, this is developed as a flap 58 that can be swiveled about a swivel axis 60. In the representation according to FIG. 3, headlight masking 32 is shown in the non-activated state, i.e. illumination device 54 is able to apply standard light cone 16 to the roadway region without restriction. In order to achieve the possibility of a maximum effect on standard light cone 16, headlight masking 32 is mounted as close as possible behind the exit region of standard light cone 16 from housing 56 of headlight module 52.

Figure 4:
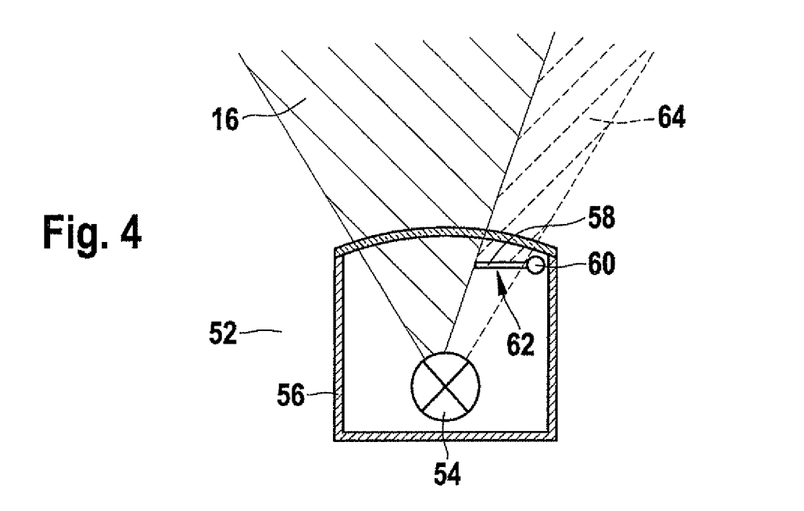
FIG. 4 shows a restricted light cone in response to an activated masking using the flap as in FIG. 3.

In the illustration according to FIG. 4, one may see a restricted light cone in response to an activated headlight masking, using the flap shown in FIG. 3.

It is indicated in FIG. 4 that, by contrast to the illustration according to FIG. 3, flap 58 has been swiveled into its activated position. For this purpose, flap 58 is reset using a suitable adjustment drive about swivel axis 60, and takes up a position 62. This generates a restricted light cone which, in comparison with standard light cone 16, according to the illustration in FIG. 3, is reduced by a region 64 that is not illuminated. Depending on requirements, headlight masking 32 may be situated on the right side of the vehicle in left-hand drive vehicles, and on the left side of the vehicle in right-hand drive vehicles.

In contrast to the embodiment variants according to FIGS. 3 and 4, headlight masking 32 may also be developed to be dome-shaped or umbrella-shaped, and, instead of about a swivel axis 60 that extends in a vertical direction, may also be developed in the form of a multi-jointed curtain that is able to be pushed out, or the like, which is able to be moved from the exit side of headlight 52 in the vertical direction, and has an effect on the light cone generated by illumination device 54. By illumination device one should understand both a usual H4 bulb and a xenon driving light, or LED headlight modules that have been used in recent times.

Figure 5:
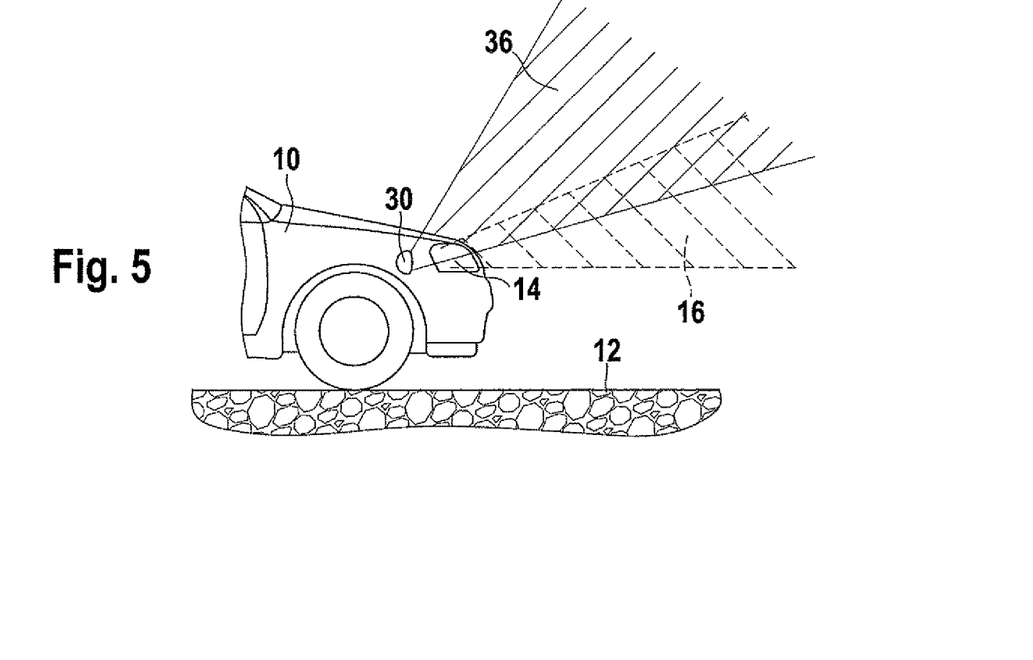
FIG. 5 shows the light cone of the standard illuminating device and the additional illuminating device superimposed on each other.
Figure 6:
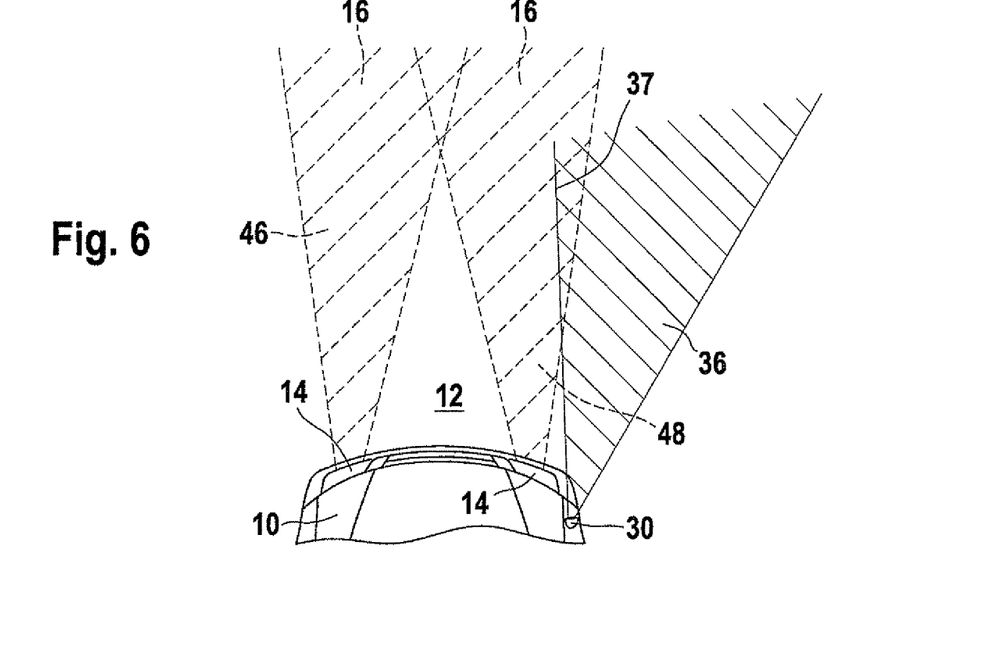
FIG. 6 shows superimposed light cones of the standard illuminating device and the additional illuminating device in front of the motor vehicle.

From the representations according to FIGS. 5 and 6, one may infer light cones of standard devices and additional illuminating devices superimposed on each other both in a side view and also in a top view onto the vehicle.

It may be seen, for example, in the illustration according to FIG. 5 that, in this embodiment variant on vehicle 10, an additional illuminating device 30 is mounted laterally on the front fender. An additional illuminated region 36 is generated, by additional illuminating device 30, and it extends fan-shaped in the vertical direction in front of the vehicle. The standard light cone is generated by headlights 14 of vehicle 10, at activated lower headlight beam 16, which has a vertical aperture angle 18 (compare the representation according to FIG. 1).

From the top view according to FIG. 6, one may see that first individual cone 46 and second individual cone 48 of the standard light cone, generated by standard headlights 14, illuminate roadway 12 in front of vehicle 10. Individual cones 46 and 48 are superimposed on each other. On the right side of the vehicle there is additional illuminating device 30 indicated in FIG. 5, which generates an additional illuminated region 36. Along a boundary 37, there extends an overlapping of standard headlight 14 situated on the right side of the vehicle and second individual cone 48 generated by the standard headlight 14, and additional illuminated region 36 shown in a top view, i.e. lying in a two-dimensional plane.

What is claimed is:

1. A method for illuminating an edge region of a roadway by at least one headlight of a vehicle, which passes along the roadway and which includes a camera, the method comprising:
   activating a masking of a headlight that is already present; and
   generating an additional illuminated region in a vertical and a lateral extension with reference to the vehicle,
   wherein the activation of the masking of a headlight that is already present takes place via a navigation system of the vehicle, or in response to the decrease in the speed of the vehicle and/or by an object/traffic sign recognition by the camera.

2. The method as recited in claim 1, wherein the activation of the masking of a headlight that is already present takes place in response to a deceleration of the vehicle and/or in response to falling below a certain, individually specifiable speed threshold.

3. The method as recited in claim 2, wherein the activation of the masking of at least one headlight that is already present takes place by a day/night detection or in response to bad weather.

4. The method as recited in claim 1, wherein the activation of the masking of at least one headlight already present takes place using the camera, particularly embodied as the video camera, by an object detection and a traffic sign detection.

5. A method for illuminating an edge region of a roadway by at least one headlight of a vehicle, which passes along the roadway and which includes a camera, the method comprising:
   activating at least one additional illuminating device or a masking of a headlight that is already present; and
   generating an additional illuminated region in a vertical and a lateral extension with reference to the vehicle,
   wherein the activation of the at least one additional illuminating device or of the masking of a headlight that is already present takes place via a navigation system of the vehicle, or in response to the decrease in the speed of the vehicle and/or by an object/traffic sign recognition by the camera, and
   wherein the activation of the at least one additional illuminating device or the at least one headlight masking of a headlight that is already present, takes place by the navigation system of the vehicle as soon as a branching-off, a fork in the road, or a crossing is reached.

6. A method for illuminating an edge region of a roadway by at least one headlight of a vehicle, which passes along the roadway and which includes a camera, the method comprising:
   activating at least one additional illuminating device or a masking of a headlight that is already present; and
   generating an additional illuminated region in a vertical and a lateral extension with reference to the vehicle,
   wherein the activation of the at least one additional illuminating device or of the masking of a headlight that is already present takes place via a navigation system of the vehicle, or in response to the decrease in the speed of the vehicle and/or by an object/traffic sign recognition by the camera, and
   wherein the activation of the at least one additional illuminating device or the headlight masking of a headlight that is already present, takes place by activating a night vision system function, by an individual signal of the driver or by a corresponding signal of a day/night-detecting light sensor.

7. A device configured to implement a method for illuminating an edge region of a roadway by at least one headlight of a vehicle, which passes along the roadway and which includes a camera, the method comprising:
- activating at least one additional illuminating device provided in addition to headlights of a vehicle, the at least one additional illuminating device being developed as a separate headlight which is located in the fender region of the vehicle or in the region of one or both front headlights of the vehicle; and
- generating an additional illuminated region in a vertical and a lateral extension with reference to the vehicle,
- wherein the activation of the at least one additional illuminating device takes place via a navigation system of the vehicle, or in response to the decrease in the speed of the vehicle and/or by an object/traffic sign recognition by the camera.

8. The device as recited in claim 7, wherein the at least one additional illuminating device is integrated into a fog light or a daytime running light function.

9. The device as recited in claim 7, wherein the at least one additional illuminating device is designed to be selectively controllable, particularly to be dimmable, and radiates light in the IR and/or the VIS range and/or is integrated into a headlight range regulation.

10. The device as recited in claim 7, wherein in the case of the development of the headlight as an LED headlight module, individual LED's face the edge of the roadway, generate an additional illuminated region and are configured to be individually switched on and off.

* * * * *

UNITED STATES PATENT AND TRADEMARK OFFICE
CERTIFICATE OF CORRECTION

PATENT NO. : 8,721,144 B2  Page 1 of 1
APPLICATION NO. : 13/262745
DATED : May 13, 2014
INVENTOR(S) : Andreas Schmack It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 266 days.

Signed and Sealed this

Twenty-ninth Day of September, 2015

Michelle K. Lee
*Director of the United States Patent and Trademark Office*